US012793234B2

(12) United States Patent
Yu

(10) Patent No.: US 12,793,234 B2
(45) Date of Patent: Nov. 10, 2026

(54) IMAGE PROCESSING APPARATUS AND METHOD

(71) Applicant: Realtek Semiconductor Corporation, Hsinchu (TW)

(72) Inventor: Chung-Ping Yu, Hsinchu (TW)

(73) Assignee: Realtek Semiconductor Corporation, Hsinchu (TW)

(*) Notice: Subject to any disclaimer, the term of this patent is extended or adjusted under 35 U.S.C. 154(b) by 228 days.

(21) Appl. No.: 18/635,021

(22) Filed: Apr. 15, 2024

(65) Prior Publication Data

US 2025/0166207 A1 May 22, 2025

(30) Foreign Application Priority Data

Nov. 16, 2023 (TW) ................................ 112144355

(51) Int. Cl.
*G06T 7/223* (2017.01)
*G06T 3/40* (2024.01)
*G06T 7/246* (2017.01)

(52) U.S. Cl.
CPC ................ *G06T 7/223* (2017.01); *G06T 3/40* (2013.01); *G06T 7/248* (2017.01); *G06T 2207/30204* (2013.01)

(58) Field of Classification Search
CPC G06T 7/223; G06T 7/248; G06T 3/40; G06T 2207/30204
See application file for complete search history.

(56) References Cited

U.S. PATENT DOCUMENTS

2003/0223644 A1* 12/2003 Park ........................ H04N 19/61 375/E7.106
2010/0034274 A1* 2/2010 Li .......................... H04N 5/145 375/E7.123

(Continued)

FOREIGN PATENT DOCUMENTS

CA 3233491 A1 * 4/2023 ............ B41M 5/007
CN 102474568 A * 5/2012 ............ H04N 23/68

(Continued)

OTHER PUBLICATIONS

Timofey S. Chernov et al., "A method of periodic pattern detection on document images", ECMS 2015 Proceedings edited by: Valeri M. Mladenov, Grisha Spasov, Petia Georgieva, Galidiya Petrova, European Council for Modeling and Simulation, doi:10.7148/2015-0506.

*Primary Examiner* — Qun Shen
(74) *Attorney, Agent, or Firm* — CKC & Partners Co., LLC

(57) ABSTRACT

An image processing apparatus and method are provided. An image processing device is configured to execute the following operations. The apparatus marks a first periodic block in a down-sized current frame with a first label. The apparatus performs a first motion estimation on the down-sized current frame and a down-sized reference frame based on the first label to generate first motion vectors. The apparatus marks an n-th periodic block having another periodic feature in a current frame with an n-th label. The apparatus performs an n-th motion estimation on the current frame and a reference frame based on the n-th label to generate n-th motion vectors. The apparatus performs a motion compensation on the current frame and the reference frame based on the n-th motion vectors to generate a compensated frame.

16 Claims, 11 Drawing Sheets

(56) References Cited

U.S. PATENT DOCUMENTS

| | | | | |
|---|---|---|---|---|
| 2014/0226722 | A1* | 8/2014 | Izvorski | H04N 19/54 375/240.16 |
| 2015/0003528 | A1* | 1/2015 | Toichi | G06T 7/238 375/240.14 |
| 2015/0296218 | A1* | 10/2015 | Pasupuleti | H04N 19/577 375/240.15 |
| 2018/0131959 | A1* | 5/2018 | Chang | H04N 19/527 |
| 2018/0342073 | A1* | 11/2018 | Matsumura | G01V 1/50 |
| 2020/0154129 | A1* | 5/2020 | Su | H04N 19/513 |

FOREIGN PATENT DOCUMENTS

| | | | | | |
|---|---|---|---|---|---|
| CN | 102930559 | A | * | 2/2013 | |
| CN | 114745555 | A | * | 7/2022 | H04N 19/513 |
| CN | 107481259 | B | | 11/2022 | |

* cited by examiner

IMAGE PROCESSING APPARATUS AND METHOD

CROSS-REFERENCE TO RELATED APPLICATION

This application claims priority to Taiwan Application Serial Number 112144355, filed Nov. 16, 2023, which is herein incorporated by reference in its entirety.

BACKGROUND

Field of Invention

The present disclosure relates to an image processing apparatus and method. More particularly, the present disclosure relates to an image processing apparatus and method for motion estimations (ME) and motion compensations (MC).

Description of Related Art

In the field of image processing, when a frame rate conversion (FRC) is performed, it may first calculate motion vectors through a motion estimation process and continue by handing over to a motion compensation process in order to generate an interpolated frame between two original frames. This conversion may create smoother video streams.

However, when the motion estimation is performed, if there are repetitive patterns in the frame, such as blinds, striped shirts, windows of office buildings, containers at the dock, etc., misjudgments may occur in motion estimation and lead to periodic broken or repeat broken, thereby generating the wrong motion vector. When the misjudgments occur, unnatural fragmented patterns will appear in the frame, resulting in a degraded viewing experience. Furthermore, the computational burden will increase if periodic patterns of various sizes and ranges need to be detected in order to detect whether repetitive patterns appear in frames.

In view of this, how to detect the positions of repetitive patterns in the frame and correct the results of motion estimation, while taking into account periodic patterns of various sizes and ranges as well as efficiency, is the goal that the industry strives to work on.

SUMMARY

The disclosure provides an image processing apparatus comprising a storage and a processor. The storage is configured to store a current frame and a reference frame. The processor is coupled to the storage and configured to execute the following operations: downsizing the current frame and the reference frame to generate a down-sized current frame and a down-sized reference frame respectively; marking at least one of a plurality of first blocks in the down-sized current frame as at least one first periodic pattern block with at least one first label respectively, wherein the at least one first periodic pattern block has a first periodic feature; performing a first motion estimation on the down-sized current frame and the down-sized reference frame based on the at least one first label to generate a plurality of first motion vectors; marking at least one of a plurality of n-th blocks in the current frame as at least one n-th periodic pattern block with at least one n-th label respectively, wherein the at least one n-th periodic pattern block has a n-th periodic feature; performing an n-th motion estimation on the current frame and the reference frame based on the first motion vectors and the at least one n-th label to generate a plurality of n-th motion vectors; and performing a motion compensation on the current frame and the reference frame based on the n-th motion vectors to generate a compensated frame between the current frame and the reference frame.

The disclosure further provides an image processing method. The image processing method is adapted for use in an electronic apparatus. The image processing method comprises the following steps: downsizing a current frame and a reference frame to generate a down-sized current frame and a down-sized reference frame respectively; marking at least one of a plurality of first blocks in the down-sized current frame as at least one first periodic pattern block with at least one first label respectively, wherein the at least one first periodic pattern block has a first periodic feature; performing a first motion estimation on the down-sized current frame and the down-sized reference frame based on the at least one first label to generate a plurality of first motion vectors; marking at least one of a plurality of n-th blocks in the current frame as at least one n-th periodic pattern block with at least one n-th label respectively, wherein the at least one n-th periodic pattern block has a n-th periodic feature; performing an n-th motion estimation on the current frame and the reference frame based on the first motion vectors and the at least one n-th label to generate a plurality of n-th motion vectors; and performing a motion compensation on the current frame and the reference frame based on the n-th motion vectors to generate a compensated frame between the current frame and the reference frame.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
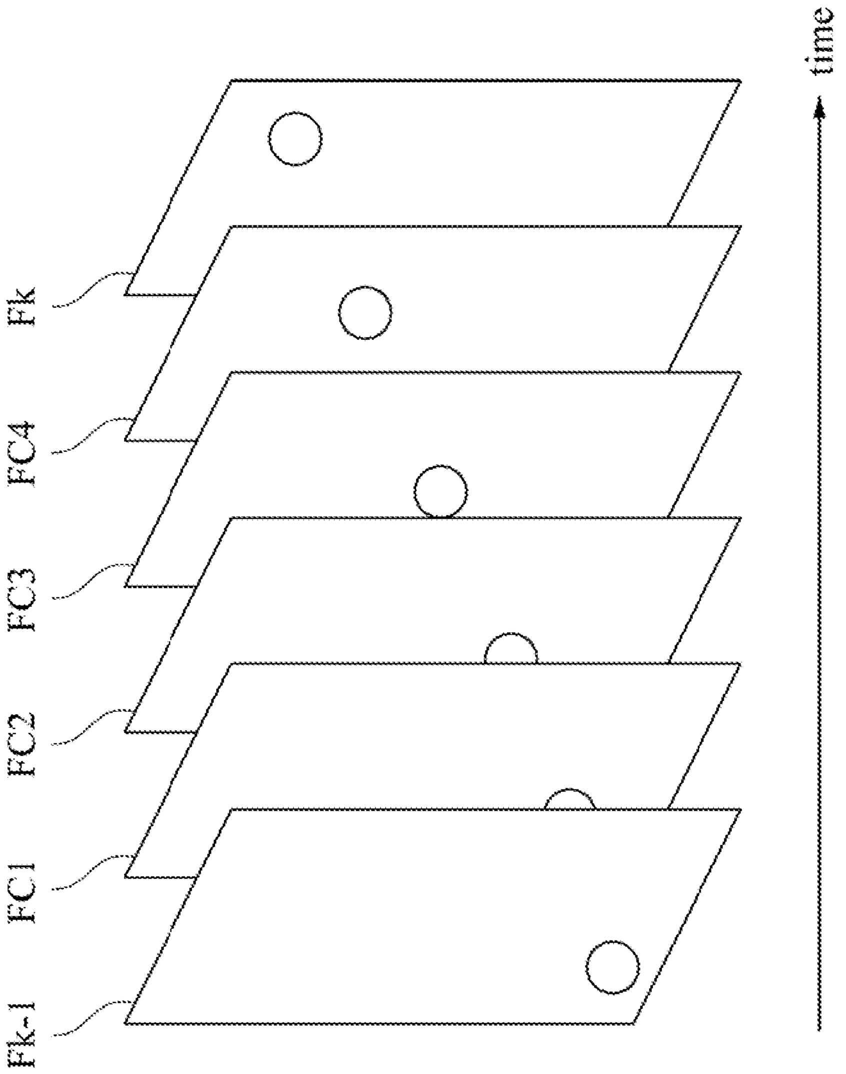
FIG. 1 is a schematic diagram illustrating the motion estimation and the motion compensation generate interpolated frames between two frames according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Motion estimations and motion compensations are used for generating an interpolated frame between two frames to increase frame rates. For example, please refer to FIG. 1, frames Fk−1 and Fk are two adjacent frames in a video, and the motion estimation and the motion compensation are used for generating the interpolated frames FC1-FC4 between the frames Fk−1 and Fk. In the motion estimations, the frames Fk−1 and Fk can be segmented into i*j blocks, and a best motion vector of each of the blocks can be calculated through 3D recursive searching.

More specifically, the 3D recursive searching comprises multiple scan operations. Each of the scan operations generates multiple motion vector candidates in the range of a search window based on an initial vector and features of image changing for each of the blocks. One of the candidate motion vectors with the highest suitability can be selected as the motion vector of the block from candidate motion vectors such as a zero vector, a spatial vector, a temporal vector, a random vector, and a global vector. Next, when performing the scan operation again, the initial vector can be calculated as the motion vectors of every block from the last scan operation adding a random vector. Accordingly, the optimal motion vector (e.g., motion vectors MV1-MVn described later) of each blocks is able to be converged through multiple scan operations.

Next, the motion compensation generates the interpolated frames FC1-FC4 between the frames Fk−1 and Fk based on the frames Fk−1 and Fk and the optimal motion vector of each blocks. For example, if the optimal motion vector is roughly the vector from lower left to upper right, the circles in the interpolated frames FC1-FC4 will be arranged from lower left to upper right sequentially based on the circle in the lower left corner in the frame Fk−1 and the circle in the upper right corner in the frame Fk. Namely, the interpolated frames FC1-FC4 can be generated based on the frames Fk−1 and Fk through the operations of the motion estimation and the motion compensation.

To avoid fragmentation of interpolated frames caused by repetitive patterns during the motion estimation, before executing the motion estimation and the motion compensation, whether periodic patterns exist in the frame can be determined first. For example, first, a processor calculates multiple grayscale differences between the multiple adjacent pixels in the frame Fk−1 to obtain the trend of the pixel values, multiple peak pixels, and multiple valley pixels. In some embodiments, the peak pixel refers to a pixel on the turning point from increasing grayscale values to decreasing grayscale values. In some embodiments, the valley pixel refers to a pixel on the turning point from decreasing grayscale values to increasing grayscale values. Next, the processor calculates peak-to-peak distances between the peak pixels and valley-to-valley distances between the valley pixels and analyzes whether there is a periodic feature between the peak-to-peak distances and the valley-to-valley distances, e.g., the peak-to-peak distances are similar to each other and the valley-to-valley distances are similar to each other. Finally, the processor marks the blocks with periodic feature existing between the peak-to-peak distances and the valley-to-valley distances in the frame Fk−1.

Figure 2:
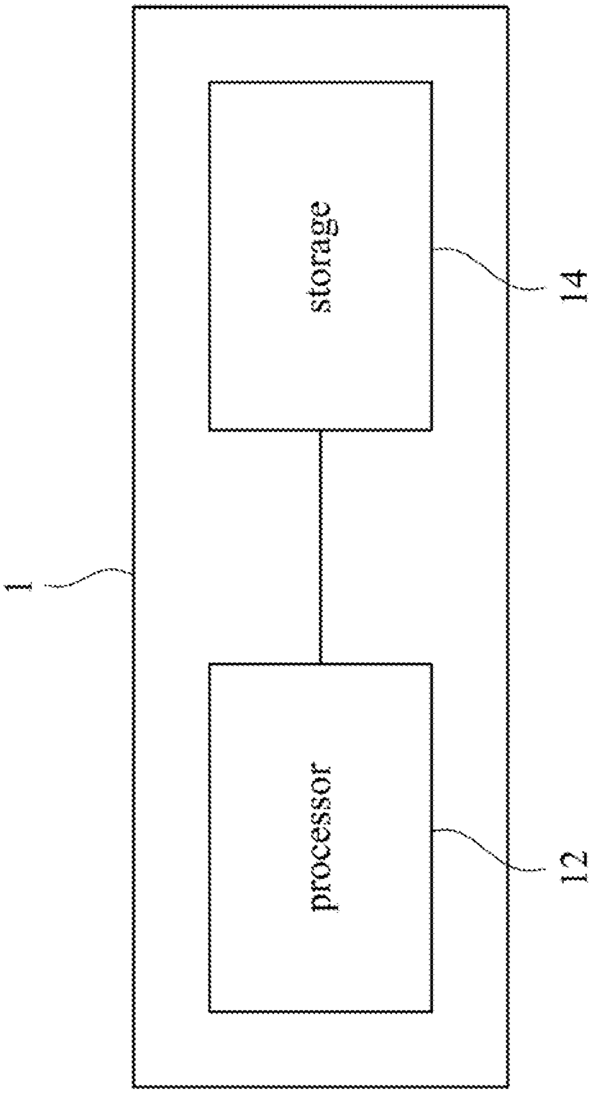
FIG. 2 is a schematic diagram illustrating an image processing apparatus according to some embodiments of the present disclosure.

For detecting whether periodic patterns appear in the frame and executing the motion estimation and the motion compensation of the frame, an image processing apparatus is provided by the present disclosure. Please refer to FIG. 2. FIG. 2 is a schematic diagram illustrating an image processing apparatus 1 according to a first embodiment of the present disclosure. As shown in FIG. 2, the image processing apparatus 1 comprises a processor 12 and a storage 14, wherein the processor 12 is coupled to the storage 14.

In some embodiments, the processor 12 can comprise a central processing unit (CPU), a graphics processing unit (GPU), a multi-processor, a distributed processing system, an application specific integrated circuit (ASIC), and/or a suitable processing unit.

In some embodiments, the storage 14 can comprise a semiconductor or solid-state memory, a magnetic tape, a removable computer diskette, a random-access memory (RAM), a read-only memory (ROM), a rigid magnetic disk, and/or an optical disk.

Figure 3:
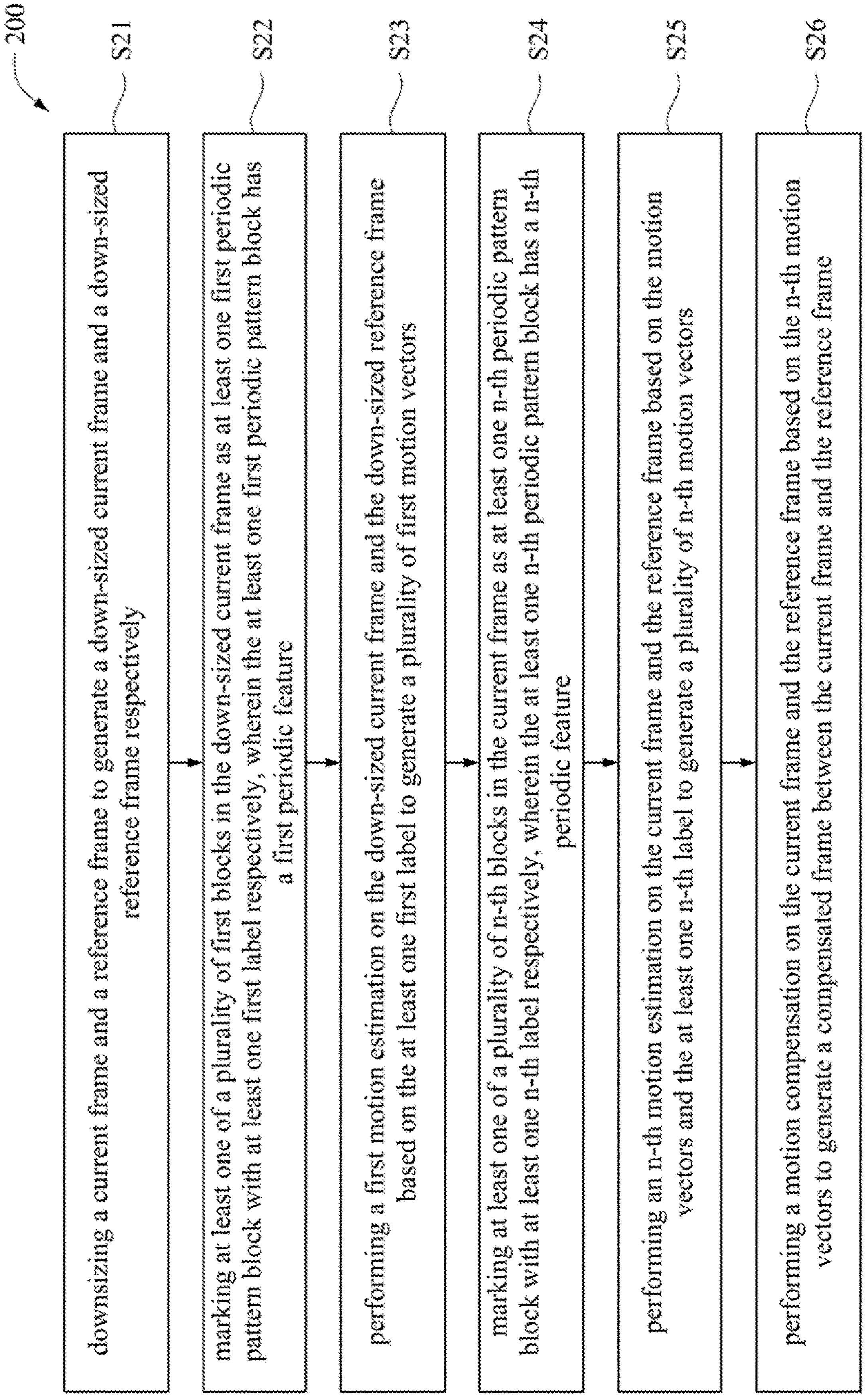
FIG. 3 is a flow diagram illustrating an image processing method according to some embodiments of the present disclosure.

Please further refer to FIG. 3. FIG. 3 is a flow diagram illustrating an image processing method 200 according to an embodiment of the present disclosure, wherein the image processing method 200 comprises steps S21-S26. The image processing apparatus 1 is configured to execute the image processing method 200 to execute the motion estimation and the motion compensation, wherein the image processing apparatus 1 detects whether there is a periodic pattern appears in the frame and the position of the periodic pattern before generating the motion vectors.

In the step S21, the processor 12 of the image processing apparatus 1 downsizes the current frame Fn and the reference frame Ffn to generate multiple down-sized current frames F1-Fn−1 with different resolutions and multiple down-sized reference frame Ff1-Ffn−1 with different resolutions respectively.

Figure 4:
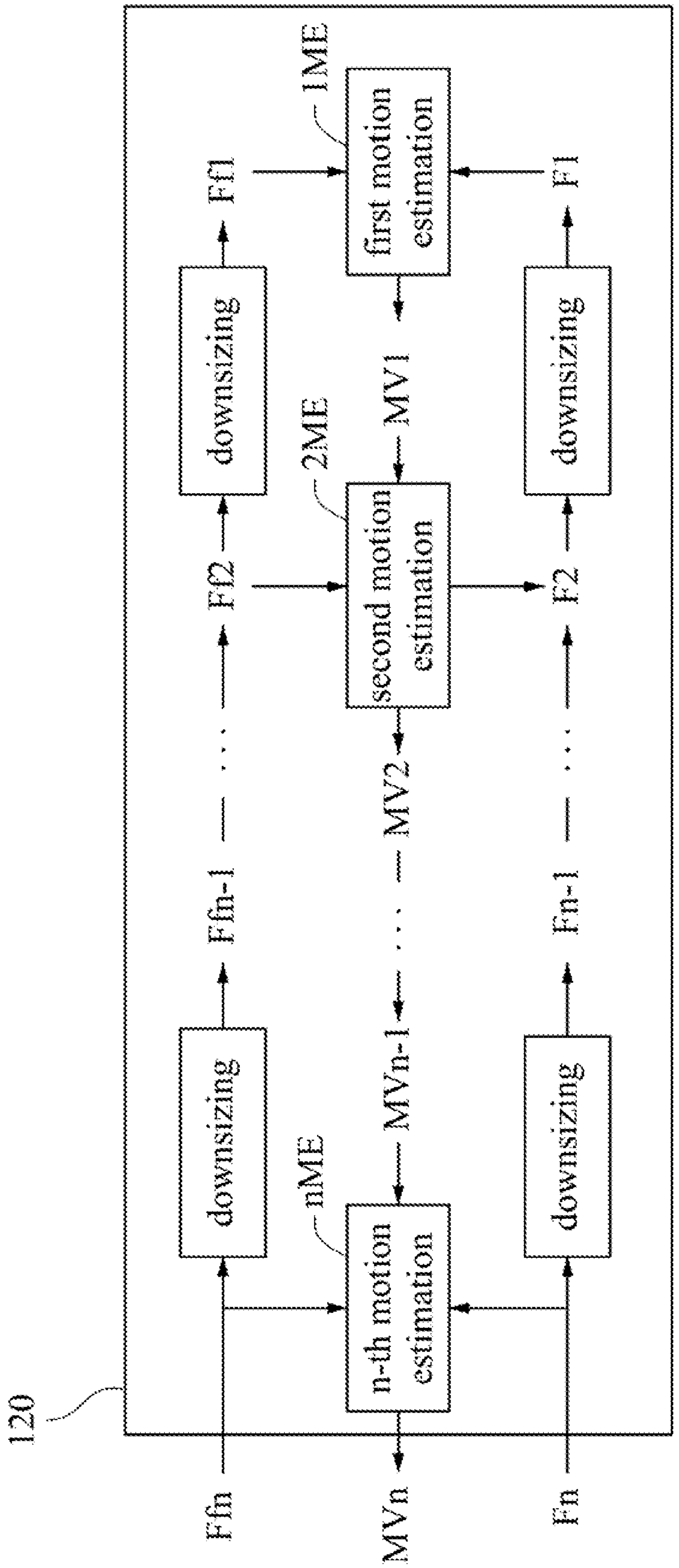
FIG. 4 is a schematic diagram illustrating a motion estimation operation according to some embodiments of the present disclosure.
Figure 5:
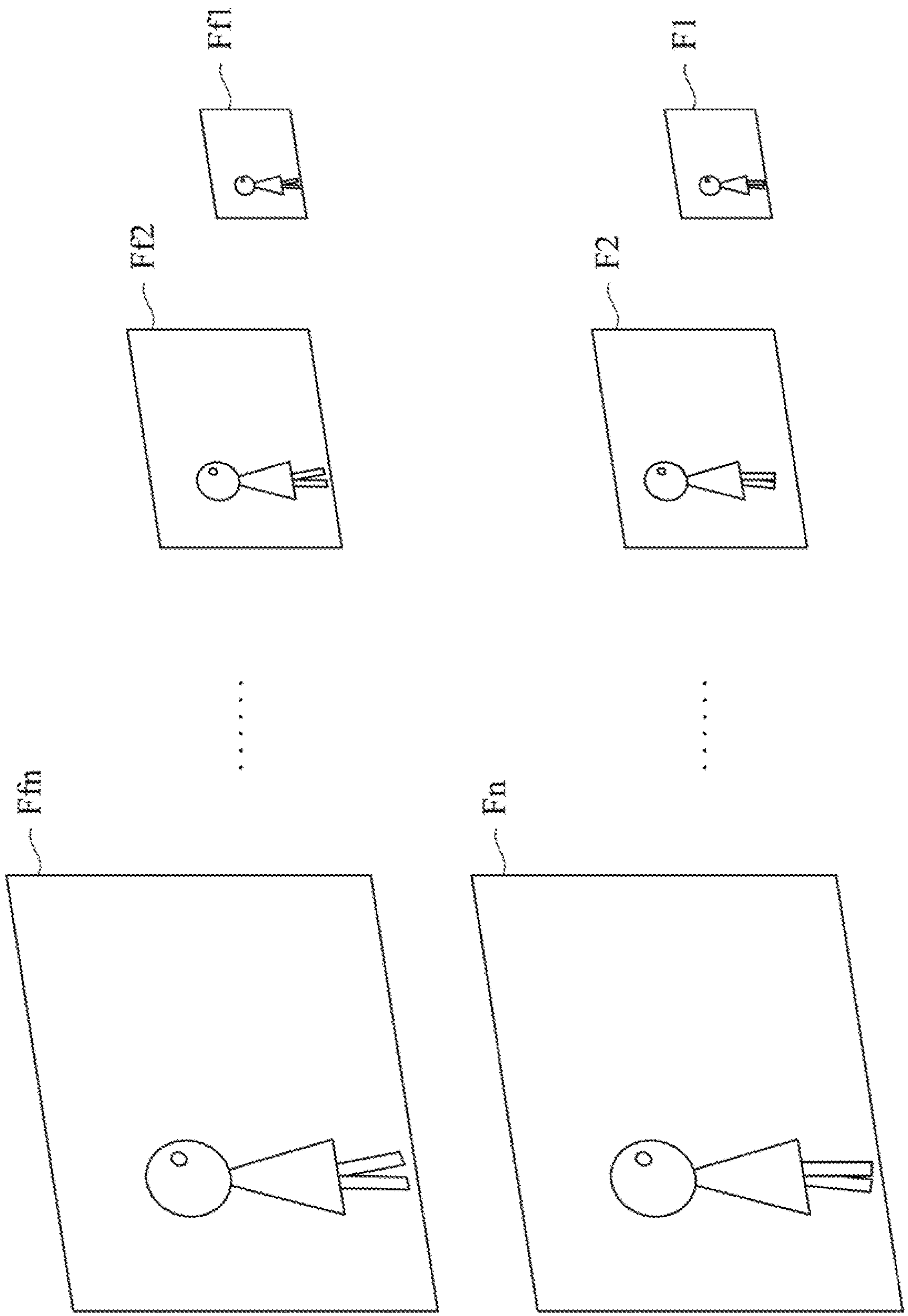
FIG. 5 is a schematic diagram illustrating downsizing the frames according to some embodiments of the present disclosure.

Specifically, please refer to FIG. 4-5. FIG. 4 is a schematic diagram illustrating a motion estimation operation MEP according to an embodiment of the present disclosure. FIG. 5 is a schematic diagram illustrating downsizing the frames according to an embodiment of the present disclosure. The frames Fn−1 and Ffn−1 are the frames of the current frame Fn and the reference frame Ffn after being downsized once respectively. By analogy, the frames F1 and Ff1 are the frames of the current frame Fn and the reference frame Ffn after being downsized n−1 times respectively. For example, the downsizing rate can be ½ or ¼, but the present disclosure is not limited thereto. In an embodiment, the current frame Fn is the frame Fk−1 shown in FIG. 1, the reference frame Ffn is the frame Fk shown in FIG. 1. Namely, the current frame Fn and the reference frame Ffn can be two adjacent frames in continuous images (e.g., a video), but the present disclosure is not limited thereto.

In the step S22, the processor 12 of the image processing apparatus 1 marks at least one of a plurality of first blocks in the down-sized current frame F1 as at least one first periodic pattern block with at least one first label respectively, wherein the at least one first periodic pattern block has a first periodic feature.

Specifically, before executing a first motion estimation 1ME, the processor 12 will first mark the block (i.e., the first periodic pattern block) with a periodic pattern (e.g., images of repeating patterns such as blinds, striped shirts, windows of office buildings, containers at the dock), wherein the first label indicates the block with a periodic pattern in the frame F1.

Figure 6:
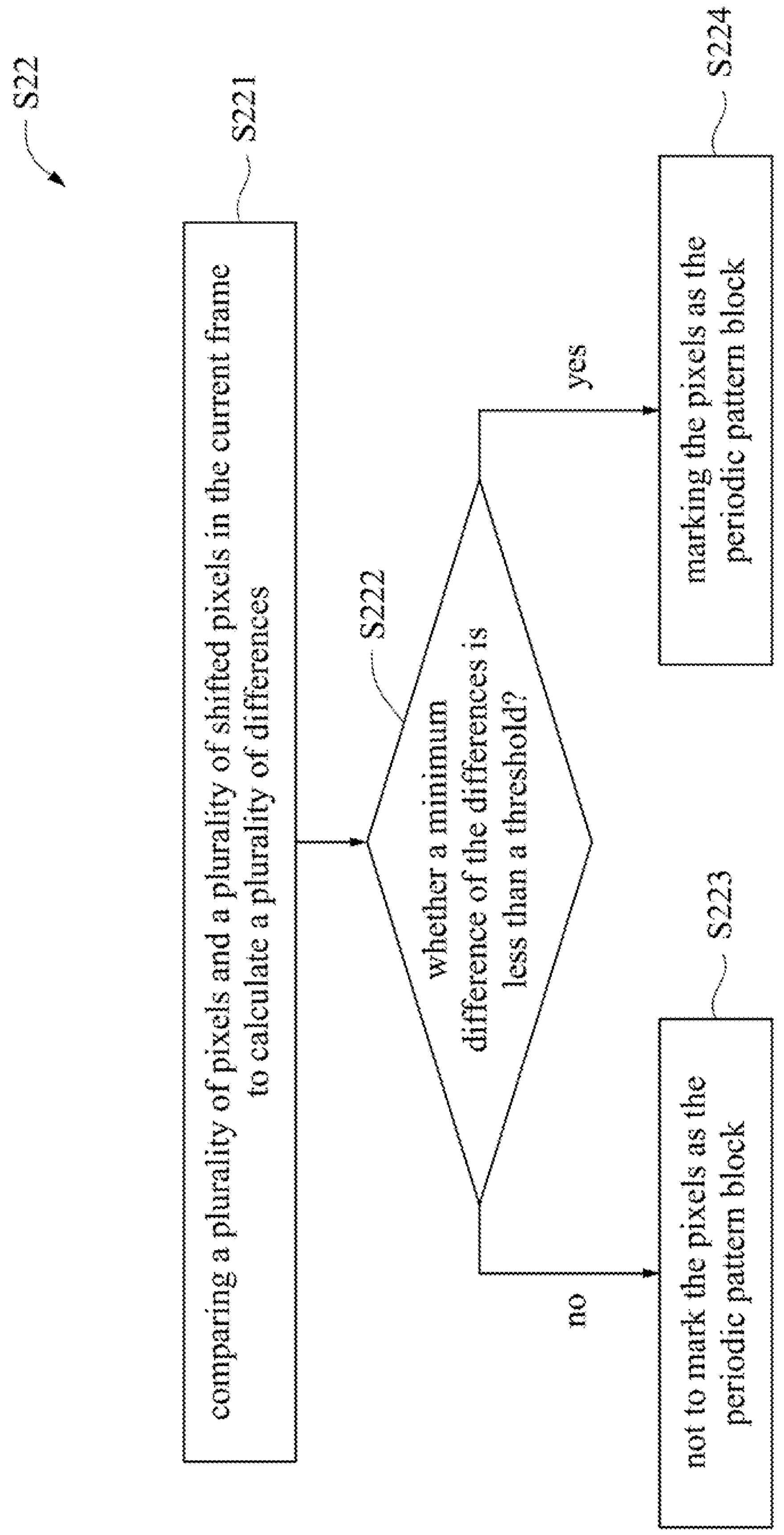
FIG. 6 is a flow diagram illustrating operations of marking the periodic pattern block according to some embodiments of the present disclosure.
Figure 7:
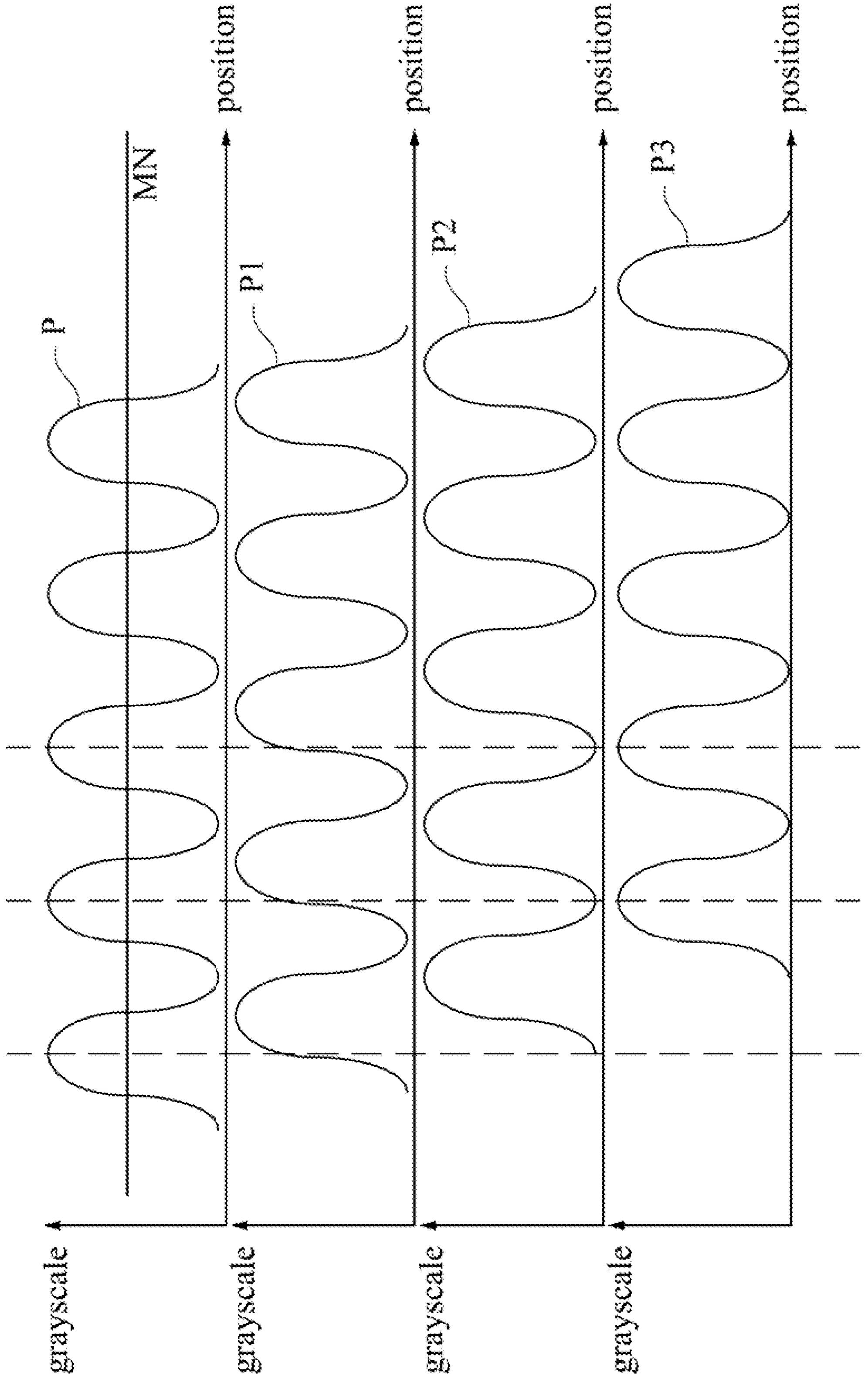
FIG. 7 is a schematic diagram illustrating shifting and comparing the pixels in a graphic according to some embodiments of the present disclosure.

In some embodiments, the step S22 further comprises steps S221-S224. The processor 12 can mark the first periodic pattern block through the steps S221-S224. For clarity, please refer to FIG. 6 for the flow diagram of the steps S221-S224. FIG. 7 is a schematic diagram illustrating grayscales of multiple graphics according to an embodiment of the present disclosure. The steps S221-S224 in FIG. 6 will be illustrated below in conjunction with FIG. 7. In the step S221, the processor 12 compares a graphic P and a plurality of shifted graphics P1, P2, and P3 in the frame F1 to calculate a plurality of grayscale differences. More specifically, the graphic P is formed by multiple sequentially arranged pixels in the frame F1. The processor 12 shifts the graphic P along the same direction by multiple different shifting values to obtain multiple shifted graphics P1, P2, and P3. In some embodiments, the shifting values corresponding to the shifted graphics P1, P2, and P3 are M pixels, 2*M pixels, and 3*M pixels respectively, wherein M is a positive integer. The processor 12 calculates the grayscale differences of overlapping pixels between the graphic P and each of the graphics P1, P2, and P3.

For example, assumes that M is 1, the grayscale difference between the graphic P and the shifted graphic P1 is calculated though the following method: (1) calculating the absolute value of subtracting the grayscale of the first pixel of the shifted graphic P1 from the grayscale of the second pixel of the graphic P, calculating the absolute value of subtracting the grayscale of the second pixel of the shifted graphic P1 from the grayscale of the third pixel of the graphic P, and so forth; and (2) calculating the mean value of the absolute values above to obtain the grayscale difference between the graphic P and the shifted graphic P1. Similarly, the grayscale difference between the graphic P and the shifted graphic P2 and P3 can also be calculated through the above method, for brevity, the method will not be repeated again. Therefore, the grayscale differences between the graphic P and each of the shifted graphics P1, P2, and P3 can represent the similarities between the graphic P and each of the shifted graphics P1, P2, and P3.

Next, in the step S222, the processor 12 selects a minimum grayscale difference (e.g., the grayscale differences between the graphic P and the shifted graphic P3) from the grayscale differences corresponding to the shifted graphics P1, P2, and P3 and determines whether the minimum grayscale difference is less than a threshold. If the minimum grayscale difference is not less than the threshold, the processor 12 determines the similarity between the graphic P and the shifted graphic is too low and executes the step S223 and not to mark the block the graphic P locating as the first periodic pattern block. In contrast, if the minimum grayscale difference is less than the threshold, the processor 12 determines there is a certain similarity between the graphic P and the shifted graphic and having periodic features. Therefore, the processor 12 can execute the step S224 to mark the block the graphic P locating as the first periodic pattern block, wherein the shifting value corresponding to the minimum grayscale difference is a pattern variation cycle of the graphic P. In other words, assumed that the minimum grayscale difference exists between the graphic P and the shifted graphic P3, it indicates that the grayscale variation cycle is 3*M pixels.

Furthermore, in some embodiments, the step S22 further comprises steps S225 and S226. Please refer to the flow diagram shown in FIG. 8, in the embodiment of FIG. 8, besides the steps S221-S224 mentioned above, the processor 12 can also execute the steps S225 and S226 to further determine the periodic feature of the graphic P. The steps S221-S224 shown in FIG. 8 are similar to the corresponding steps shown in FIG. 6, for brevity, the steps will not be repeated again.

Figure 8:
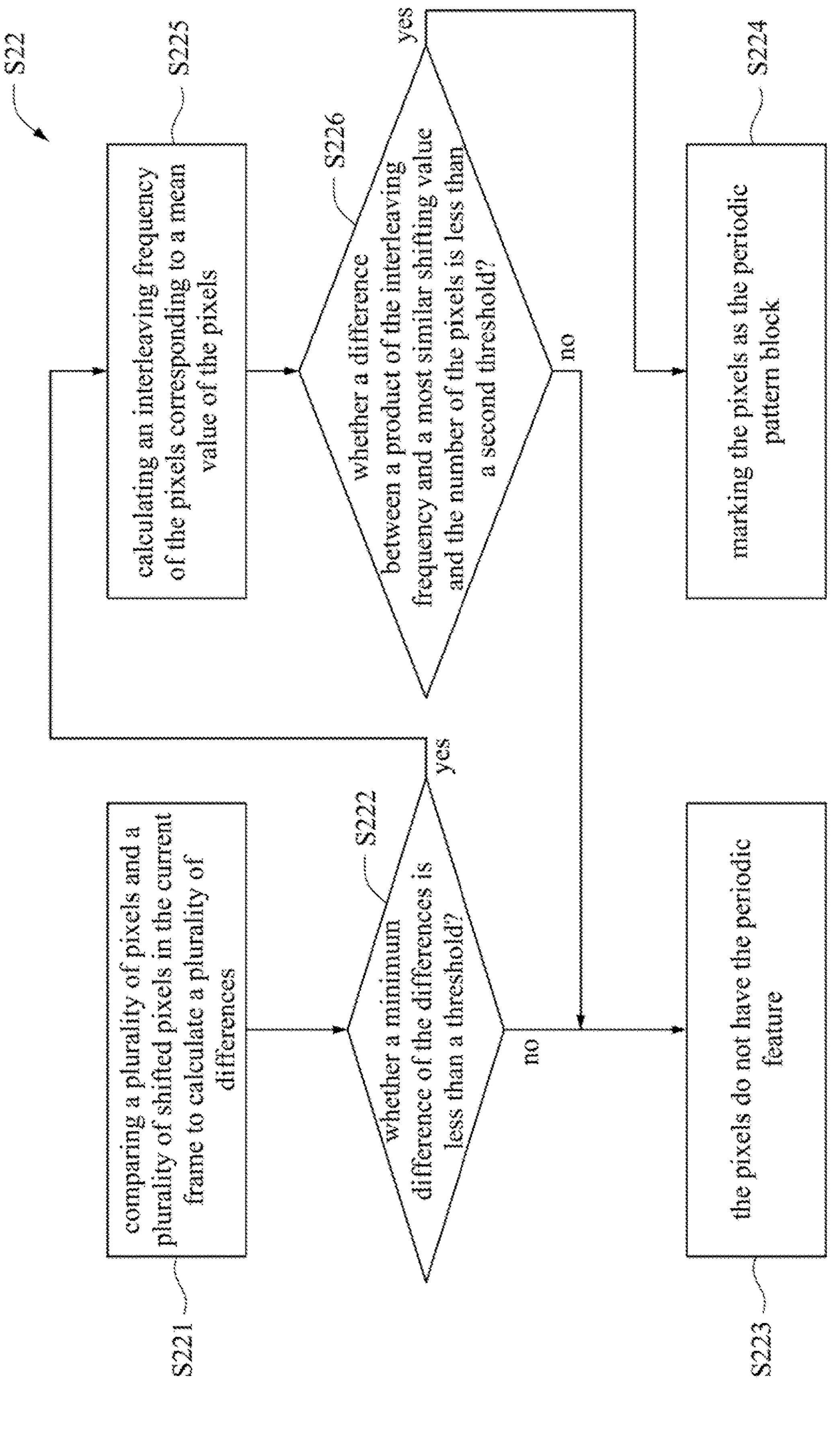
FIG. 8 is a flow diagram illustrating other operations of marking the periodic pattern block according to some embodiments of the present disclosure.

As shown in FIG. 8, in the step S225, the processor 12 calculates an interleaving frequency of each of the pixels in the graphic P corresponding to a grayscale mean value of the graphic P. Please also refer to FIG. 7, as shown in FIG. 7, the interleaving times between the curve line representing the grayscale of the graphic P and the straight line representing the corresponding grayscale mean value MN is 10. Since the curve line and the straight line will interleave two times in each of the periodic pattern variations, the processor 12 can calculates the interleaving frequency of the graphic P is 5 accordingly, representing that there are 5 periodic variations in the graphic P.

In an embodiment, the processor 12 can calculate the interleaving times through the following operations: (1) using 1 to represent the pixel values greater than the mean value in the graphic P and using −1 to represent the pixel values less than the mean value in the graphic P; (2) performing an XOR operation on every two adjacent pixels; and (3) summing every values obtained from the XOR operations to calculate the interleaving times.

For clarity, the shifting value corresponding to the minimum grayscale difference is called "the most similar shifting value" in the subsequent description. For example, in the embodiment of M being 1, since the minimum grayscale difference exists between the graphic P and the shifted graphic P3, "the most similar shifting value" is 3. Next, in the step S226, the processor 12 can subtract the number of pixels in the graphic P from the product of the interleaving frequency and the most similar shifting value to calculate the difference and comparing the difference and a second threshold. If the difference is greater than or equal to the second threshold, the processor 12 will execute the step S223. If the difference is less than the second threshold, it indicates that the pattern variation cycle of the graphic P calculated through the step S221 (i.e., the most similar shifting value) matches the interleaving frequency calculated through the step S225, and the processor 12 will execute the step S224.

For example, in the embodiment of M being 1, the shifting value of the above-mentioned minimum grayscale difference corresponding to the graphic P3 is 3 (i.e., the most similar shifting value), and the interleaving frequency calculated through the step S225 is 5. Assumed that the graphic P comprises 16 pixels and the second threshold is 3, the processor 12 can calculate the absolute value of the difference between the product of the interleaving frequency and the most similar shifting value (i.e., 15) and the number of the pixels is 1, and the processor 12 takes the absolute value as the difference. Since the difference is less than the second threshold, the processor 12 can execute the step S224, marking the block the graphic P locating as the first periodic pattern block. In contrast, if the difference calculated in the previous operations is not less than the second threshold, the processor 12 executes the step S223, not to mark the block the graphic P locating as the first periodic pattern block.

In summary, in the embodiment of FIG. 8, the processor 12 can improve the accuracy of determining whether the graphic P has a periodic feature through the additional steps S225 and S226. It is noted that, the order of the steps S221, S222, S225, and S226 shown in FIG. 8 is one of the embodiments, and the present disclosure is not limited thereto. In practice, the processor 12 can execute the steps in other order. For example, the processor 12 can execute the steps S221 and S225 at the same time and execute the steps S222 and S226 at the same time, then execute the step S223 or S224 based on the result of the steps S222 and S226.

It is noted that, in the embodiments mentioned above, although the shifted graphics P1, P2, and P3 is generated by shifting the graphic P to the right, the shifting direction and the number of the shifted graphics in the present disclosure are not limited thereto. In other embodiments, the image processing apparatus 1 can also shift the graphic P in different directions before the corresponding comparing operations to detect periodic patterns distributed in different directions, for clarity, the details will not be repeated.

Please refer to FIG. 3, in the step S23, the processor 12 of the image processing apparatus 1 performing a first motion estimation 1ME on the frame F1 and Ff1 based on the at least one first label to generate motion vectors MV1.

Specifically, when the processor 12 executes the first motion estimation 1ME and generates the motion vectors MV1, the processor 12 will adjust the motion vectors MV1 corresponding to the block with the first label (i.e., the first periodic pattern block) to prevent the subsequent interpolated frame from being broken.

Figure 9:
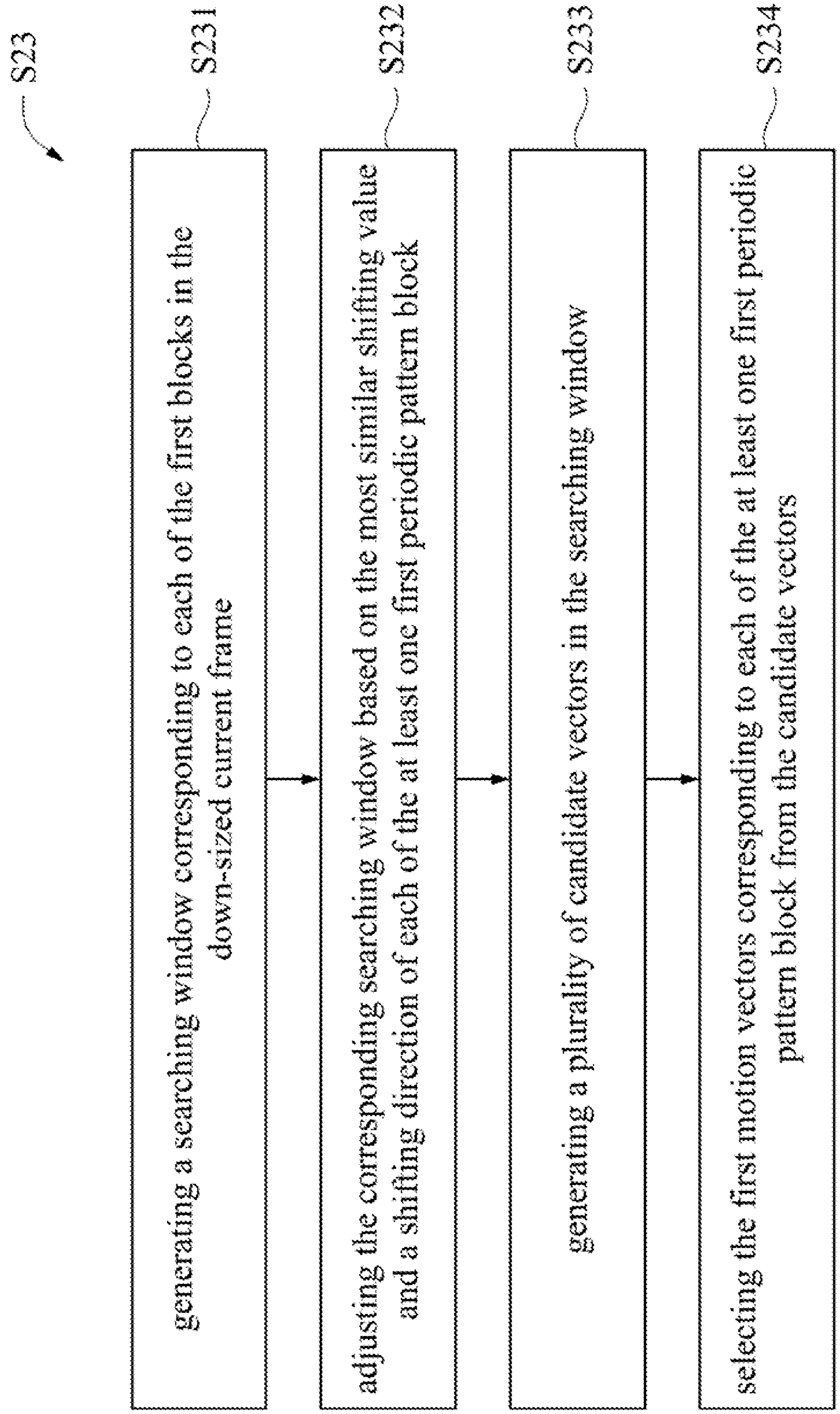
FIG. 9 is a flow diagram illustrating scan operations in the motion estimation according to some embodiments of the present disclosure.

In some embodiments, please refer to FIG. 9, the scan operations of the first motion estimation 1ME in the step S23 further comprises steps S231-S234, and the processor 12 can adjust a searching window corresponding to the first periodic pattern block through the steps S231-S234.

In the step S231, the processor 12 generates a searching window corresponding to each of the first blocks in the frame F1. In the step S232, the processor 12 adjusts the corresponding searching window based on the most similar shifting value and a shifting direction of each of the at least one first periodic pattern block (e.g., the graphic P is shifted to the right). In the step S233, the processor 12 generates a plurality of candidate vectors in the searching window. In the step S233, the processor 12 selects the first motion vectors MV1 corresponding to each of the at least one first periodic pattern block from the candidate vectors.

Specifically, if the processor 12 generates a searching window of the first periodic pattern block on the shifting direction of the periodic feature during the scan operations of the first motion estimation 1ME, the searching window may overlaps the periodic pattern of the first periodic pattern block. This may cause the first motion estimation 1ME to generate mistaken motion vectors and lead to the broken interpolated frame. Therefore, the processor 12 can avoid to generate the searching window of the first periodic pattern block on the shifting direction of the periodic feature in the step S232. Also, the processor 12 can further avoid setting the size of the searching window as a multiple of the most similar shifting value (i.e., the pattern variation cycle of the periodic feature). In some embodiments, the step S232 can be omitted.

Next, as shown in FIG. 4, after the first motion estimation 1ME (i.e., after the step S23), the processor 12 can mark the block with periodic feature in each of the frames F2-Fn and execute the motion estimation accordingly. Since the processor 12 performs similar operations on each of the frames F2-Fn, for clarity, the present disclosure will only illustrate the operations which the processor 12 performs on the frame Fn through the steps S24 and S25.

Please refer to FIG. 3, in the step S24, the processor 12 of the image processing apparatus 1 marks at least one of a plurality of n-th blocks in the frame Fn as at least one n-th periodic pattern block with at least one n-th label respectively, wherein the at least one n-th periodic pattern block has a n-th periodic feature, and n is a positive integer not less than 2.

It is noted that, for the frames F2-Fn with different sizes (different resolutions), the graphic P for comparison can be formed by the same number of pixels when determining whether each of the blocks has a periodic feature.

Since the frames with smaller sizes (e.g., the frames F1 and F2) have lower resolutions, the corresponding graphic P can be used for recognizing the periodic features with wider distribution in the frame Fn. In contrast, since the frames with larger sizes (e.g., the frames Fn−1 and Fn) have higher resolutions, the corresponding graphic P can be used for recognizing the periodic features with narrower distribution in the frame Fn. Accordingly, the processor 12 can generate the first to the n-th labels corresponding to periodic features with different distributing ranges.

In some embodiments, each time the labels are generated, the processor 12 will merge the labels generated previously to preserve the periodic pattern block determined in the previous motion estimations, wherein the term "merge" can be understood as an OR operation. Namely, after generating one or more second label, the processor 12 can perform the OR operation on the second label and one or more first label respectively to update the second label; after generating one or more n-th label, the processor 12 can perform the OR operation on the n-th label and one or more n−1-th label respectively to update the n-th label, and so forth.

Furthermore, in the step S24, the processor 12 of the image processing apparatus 1 performs an n-th motion estimation nME on the frames Fn and Ffn based on the motion vectors MVn−1 and the at least one n-th label to generate a plurality of n-th motion vectors MVn, wherein n can be a positive integer not less than 2.

Figure 10:
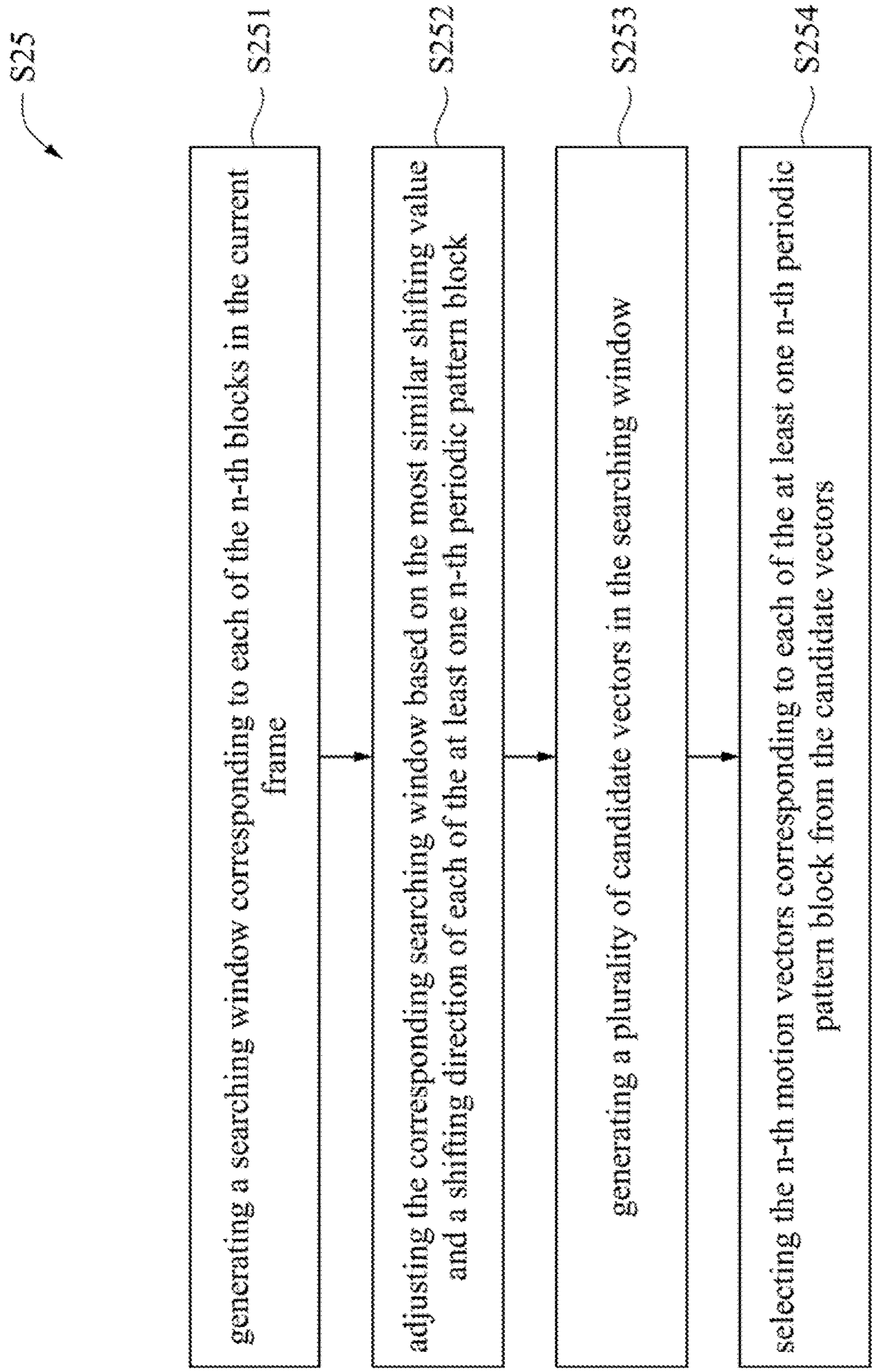
FIG. 10 is a flow diagram illustrating other scan operations in the motion estimation according to some embodiments of the present disclosure.

Similar to the step S23, the processor 12 can generate the motion vectors MVn through the same operations in the step S25. The searching operations of adjusting the corresponding searching window for the n-th periodic pattern block in the step S25 can be referred to FIG. 10. The step S25 can comprises steps S251-S254, wherein the step S251 is corresponding to S231, the step S252 is corresponding to S232, the step S253 is corresponding to S233, and the step S254 is corresponding to S234. In some embodiments, same as the step S232, the step S252 can be omitted.

However, different from the step S23, the processor 12 will refer to the motion vectors previously generated when executing the second to the n-th motion estimation 2ME-nME. For example, the processor 12 takes the previous-generated motion vectors corresponding to the same block as an initial vector for the present motion estimation to speed up the convergence of the motion vector scanning.

Figure 11:
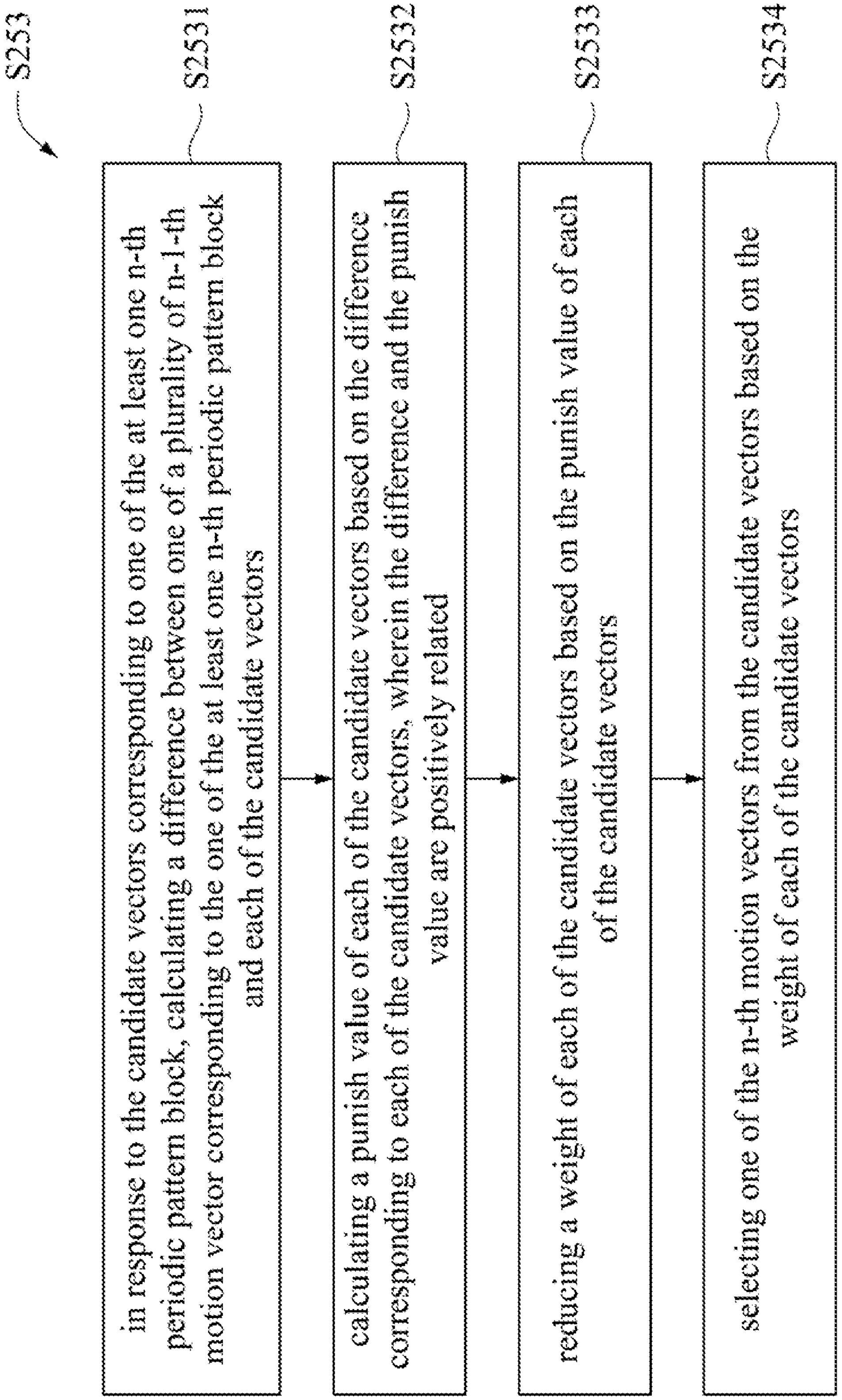
FIG. 11 is a flow diagram illustrating operations of selecting the motion vectors from the candidate vectors according to some embodiments of the present disclosure.

In some embodiments, when selecting the motion vectors corresponding to the periodic pattern block from the candidate vectors, the processor 12 can also refer to the motion vectors generated in the previous motion estimations. Please refer to FIG. 11, which illustrates steps S2531-S2534 of the step S253.

In the step S2531, in response to the candidate vectors corresponding to one of the at least one n-th periodic pattern block, the processor 12 calculates a difference between one of a plurality of n−1-th motion vector corresponding to the one of the at least one n-th periodic pattern block and each of the candidate vectors.

In the step S2532, the processor 12 calculates a punish value of each of the candidate vectors based on the difference corresponding to each of the candidate vectors, wherein the difference and the punish value are positively related.

In the step S2533, the processor 12 reduces a weight of each of the candidate vectors based on the punish value of each of the candidate vectors.

In the step S2534, the processor 12 selects one of the n-th motion vectors MVn from the candidate vectors based on the weight of each of the candidate vectors.

Specifically, when selecting the motion vectors corresponding to the n-th periodic pattern block, the processor 12 will execute the step S2531 to calculate the difference between the candidate vectors and the reference motion vectors (e.g., the absolute value of the subtraction of the two vectors).

In some embodiments, the reference motion vectors are motion vectors corresponding to the same block generated in the previous motion estimation (e.g., the n−1-th motion estimation). Accordingly, the processor 12 can refer to the result of the previous motion estimation to select the motion vectors generated in the present motion estimation.

In some embodiments, the reference motion vectors are regional motion vectors corresponding to the same block generated in the previous motion estimation (e.g., the n−1-th motion estimation). The regional motion vectors can be the mean value of the sum of the motion vectors of the block and the periodic pattern blocks nearby. Accordingly, the processor 12 can refer to the motion vectors of the periodic pattern blocks nearby from the previous motion estimation to select the motion vectors generated in the present motion estimation.

Next, the higher the difference corresponding to a candidate vector, the greater the difference between the candidate vector and the previous motion estimation result, then the higher the punish value will be generated by the processor 12 in the step S2532. In contrast, the lower the difference corresponding to a candidate vector, the less the difference between the candidate vector and the previous motion estimation result, then the lower the punish value will be generated by the processor 12 in the step S2532.

Next, the processor 12 executes the step S2533, adjusting a weight of each of the candidate vectors based on the punish value, wherein the higher the punish value, the greater the reduction of the weight, in contrast, the lower the punish value, the less the reduction of the weight.

Finally, the processor 12 executes the step S2534, selecting the n-th motion vectors MVn from the candidate vectors based on the adjusted weight.

Accordingly, the processor 12 can adjust the weights of the candidate vectors based on the difference between the candidate vectors and the motion vectors generated by the previous motion estimation. Therefore, the result of the previous motion estimation can be taken as a factor for judgement. On the other hand, if one of the candidate vectors has a relatively high weight, there is still a chance of being selected even there is a certain difference between the candidate vector and the previous-generated motion vectors.

In some embodiments, when selecting the motion vectors corresponding to the periodic pattern block from the candidate vectors, the processor 12 can also eliminate some of the candidate vectors to select the motion vectors from the other candidate vectors.

For example, the spatial candidate vector is a candidate vector generated after referring to the motion vectors of adjacent blocks. When a block is marked as the periodic pattern block, the reference credibility of the adjacent blocks is relatively lower, thus, the processor 12 can eliminate the spatial candidate vector from the candidate vectors.

In another example, the time candidate vector is a candidate vector generated after referring to the motion vectors of the last time frame. When a block is marked as the periodic pattern block, the reference credibility of the last time frame is relatively lower, thus, the processor 12 can eliminate the time candidate vector from the candidate vectors.

In another example, the random candidate vector is a candidate vector generated randomly. When a block is marked as the periodic pattern block, the risk of generating broken frames by using the random candidate vector as a motion vector, thus, the processor 12 can eliminate the random candidate vector from the candidate vectors.

Finally, in the step S26, the processor 12 of the image processing apparatus 1 performs a motion compensation on the frames Fn and Ffn based on the n-th motion vectors MVn generated by the n-th motion estimation to generate a compensated frame between the frames Fn and Ffn.

In summary, the image processing apparatus 1 of the present disclosure can take the motion estimation result of a frame with smaller size as a reference for the motion estimation of a bigger frame. Before the motion estimation operations generates motion vectors, the image processing apparatus 1 can also detect whether there is a periodic pattern appears in the frame and adjust the output of the motion estimation accordingly. Also, the image processing apparatus 1 can detect periodic pattern with different distributing ranges through detecting operations for frames in different sizes. When detecting the periodic pattern, the image processing apparatus 1 can determines whether the image matches a periodic feature based on shifting comparison and pixel variation frequency. When generating the candidate vectors, the image processing apparatus 1 can adjust the searching window referring to the periodic feature to avoid searching to the wrong block. When selecting the motion vector, the image processing apparatus 1 can adjust the weight of the candidate vectors corresponding to the block having a periodic feature in reference to the previous motion estimation. Accordingly, the image processing apparatus 1 can detect the position of the repetitive pattern in the frame during executing the motion estimation and adjust the motion estimation result accordingly. In the meantime, the periodic patterns with different sizes and distributing ranges and the efficiency are taken into account.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image processing apparatus, comprising:

a storage, configured to store a current frame and a reference frame; and a processor, coupled to the storage, configured to execute the following operations:

downsizing the current frame and the reference frame to generate a down-sized current frame and a down-sized reference frame respectively;

marking at least one of a plurality of first blocks in the down-sized current frame as at least one first periodic pattern block with at least one first label respectively, wherein the at least one first periodic pattern block has a first periodic feature, wherein the operation of marking the at least one first periodic pattern block further comprises:

comparing a plurality of pixels and a plurality of shifted pixels in the down-sized current frame to calculate a plurality of differences, wherein the shifted pixels are the pixels after being shifted based on a plurality of different shifting values, and each of the differences is corresponding to one of the different shifting values; and calculating an interleaving frequency of the pixels corresponding to a mean value of the pixels; and determining whether to mark the pixels as the at least one first periodic pattern block or not based on a minimum difference, a threshold, the interleaving frequency, and a most similar shifting value corresponding to the minimum difference;

performing a first motion estimation on the down-sized current frame and the down-sized reference frame based on the at least one first label to generate a plurality of first motion vectors;

marking at least one of a plurality of n-th blocks in the current frame as at least one n-th periodic pattern block with at least one n-th label respectively, wherein the at least one n-th periodic pattern block has a n-th periodic feature;

performing an n-th motion estimation on the current frame and the reference frame based on the first motion vectors and the at least one n-th label to generate a plurality of n-th motion vectors; and performing a motion compensation on the current frame and the reference frame based on the n-th motion vectors to generate a compensated frame between the current frame and the reference frame.

2. The image processing apparatus of claim 1, wherein the first motion estimation comprises a plurality of scanning operations, and the scanning operations further comprises:

generating a searching window corresponding to each of the first blocks in the down-sized current frame;

adjusting the corresponding searching window based on the most similar shifting value and a shifting direction of each of the at least one first periodic pattern block;

generating a plurality of candidate vectors in the searching window; and selecting the first motion vectors corresponding to each of the at least one first periodic pattern block from the candidate vectors.

3. The image processing apparatus of claim 1, wherein the n-th motion estimation comprises a plurality of a plurality of scanning operations, and the scanning operations further comprises:

generating a searching window corresponding to each of the n-th blocks in the current frame;

generating a plurality of candidate vectors in the searching window; and selecting the n-th motion vectors corresponding to each of the at least one n-th periodic pattern block from the candidate vectors.

4. The image processing apparatus of claim 3, wherein the operation of selecting one of the n-th motion vectors further comprises:

in response to the candidate vectors corresponding to one of the at least one n-th periodic pattern block, calculating a difference between a reference motion vector corresponding to the one of the at least one n-th periodic pattern block and each of the candidate vectors;

calculating a punish value of each of the candidate vectors based on the difference corresponding to each of the candidate vectors, wherein the difference and the punish value are positively related;

reducing a weight of each of the candidate vectors based on the punish value of each of the candidate vectors; and selecting one of the n-th motion vectors from the candidate vectors based on the weight of each of the candidate vectors.

5. The image processing apparatus of claim 4, wherein the reference motion vector is one of a plurality of n−1-th motion vectors corresponding to the one of the at least one n-th periodic pattern block.

6. The image processing apparatus of claim 4, wherein the reference motion vector is a regional motion vector corresponding to the one of the at least one n-th periodic pattern block, wherein the regional motion vector is corresponding to the one of the at least one n-th periodic pattern block and at least one periodic pattern block nearby the one of the at least one n-th periodic pattern block.

7. The image processing apparatus of claim 4, wherein the operation of selecting one of the n-th motion vectors further comprises:

in response to the candidate vectors corresponding to one of the at least one n-th periodic pattern block, removing a spatial candidate vector, a temporal candidate vector, and a random candidate vector from the candidate vectors; and selecting one of the n-th motion vectors from the remaining candidate vectors.

8. The image processing apparatus of claim 1, wherein the operation of marking the at least one of the n-th blocks in the current frame as the at least one n-th periodic pattern block with the at least one n-th label respectively further comprises:

performing an OR operation on the at least one n-th label and the at least one first label to update the at least one n-th label.

9. An image processing method, being adapted for use in an electronic apparatus, wherein the image processing method comprises the following steps:

downsizing a current frame and a reference frame to generate a down-sized current frame and a down-sized reference frame respectively;

marking at least one of a plurality of first blocks in the down-sized current frame as at least one first periodic pattern block with at least one first label respectively, wherein the at least one first periodic pattern block has a first periodic feature, wherein the step of marking the at least one first periodic pattern block further comprises:

comparing a plurality of pixels and a plurality of shifted pixels in the down-sized current frame to calculate a plurality of differences, wherein the shifted pixels are the pixels after being shifted based on a plurality of different shifting values, and each of the differences is corresponding to one of the different shifting values;

calculating an interleaving frequency of the pixels corresponding to a mean value of the pixels; and determining whether to mark the pixels as the at least one first periodic pattern block or not based on a minimum difference, a threshold, the interleaving frequency, and a most similar shifting value corresponding to the minimum difference;

performing a first motion estimation on the down-sized current frame and the down-sized reference frame based on the at least one first label to generate a plurality of first motion vectors;

marking at least one of a plurality of n-th blocks in the current frame as at least one n-th periodic pattern block with at least one n-th label respectively, wherein the at least one n-th periodic pattern block has a n-th periodic feature;

performing an n-th motion estimation on the current frame and the reference frame based on the first motion vectors and the at least one n-th label to generate a plurality of n-th motion vectors; and performing a motion compensation on the current frame and the reference frame based on the n-th motion vectors to generate a compensated frame between the current frame and the reference frame.

10. The image processing method of claim 8, wherein the first motion estimation comprises a plurality of scanning steps, and the scanning steps further comprises:

generating a searching window corresponding to each of the first blocks in the down-sized current frame;

adjusting the corresponding searching window based on the most similar shifting value and a shifting direction of each of the at least one first periodic pattern block;

generating a plurality of candidate vectors in the searching window; and selecting the first motion vectors corresponding to each of the at least one first periodic pattern block from the candidate vectors.

11. The image processing method of claim 9, wherein the n-th motion estimation comprises a plurality of a plurality of scanning steps, and the scanning steps further comprises:

generating a searching window corresponding to each of the n-th blocks in the current frame;

generating a plurality of candidate vectors in the searching window; and selecting the n-th motion vectors corresponding to each of the at least one n-th periodic pattern block from the candidate vectors.

12. The image processing method of claim 11, wherein the step of selecting one of the n-th motion vectors further comprises:

in response to the candidate vectors corresponding to one of the at least one n-th periodic pattern block, calculating a difference between a reference motion vector corresponding to the one of the at least one n-th periodic pattern block and each of the candidate vectors;

calculating a punish value of each of the candidate vectors based on the difference corresponding to each of the candidate vectors, wherein the difference and the punish value are positively related;

reducing a weight of each of the candidate vectors based on the punish value of each of the candidate vectors; and selecting one of the n-th motion vectors from the candidate vectors based on the weight of each of the candidate vectors.

13. The image processing method of claim 12, wherein the reference motion vector is one of a plurality of n−1-th motion vectors corresponding to the one of the at least one n-th periodic pattern block.

14. The image processing method of claim 12, wherein the reference motion vector is a regional motion vector corresponding to the one of the at least one n-th periodic pattern block, wherein the regional motion vector is corresponding to the one of the at least one n-th periodic pattern block and at least one periodic pattern block nearby the one of the at least one n-th periodic pattern block.

15. The image processing method of claim 12, wherein the step of selecting one of the n-th motion vectors further comprises:

in response to the candidate vectors corresponding to one of the at least one n-th periodic pattern block, removing a spatial candidate vector, a temporal candidate vector, and a random candidate vector from the candidate vectors; and selecting one of the n-th motion vectors from the remaining candidate vectors.

16. The image processing method of claim 9, wherein the step of marking the at least one of the n-th blocks in the current frame as the at least one n-th periodic pattern block with the at least one n-th label respectively further comprises:

performing an OR operation on the at least one n-th label and the at least one first label to update the at least one n-th label.

* * * * *